(12) United States Patent  
Ulrich

(10) Patent No.: US 8,582,286 B2  
(45) Date of Patent: Nov. 12, 2013

(54) REMOVABLE STORAGE SYSTEM FOR SERVER BAY

(75) Inventor: Michael H. Ulrich, Boulder, CO (US)

(73) Assignee: Tandberg Data Holdings S.A.R.L., Luxembourg (LU)

( * ) Notice: Subject to any disclaimer, the term of this patent is extended or adjusted under 35 U.S.C. 154(b) by 331 days.

(21) Appl. No.: 13/038,594

(22) Filed: Mar. 2, 2011

(65) Prior Publication Data

US 2012/0057292 A1 Mar. 8, 2012

Related U.S. Application Data

(60) Provisional application No. 61/310,092, filed on Mar. 3, 2010.

(51) Int. Cl.
*H05K 5/00* (2006.01)
*H05K 7/00* (2006.01)
*G06F 1/16* (2006.01)

(52) U.S. Cl.
USPC ............ 361/679.33; 361/679.31; 361/679.34; 361/679.35; 361/679.36; 361/679.37; 361/679.38; 361/679.39

(58) Field of Classification Search
USPC ........................................ 361/679.31–679.39
See application file for complete search history.

(56) References Cited

U.S. PATENT DOCUMENTS

| | | | | |
|---|---|---|---|---|
| 4,964,017 A | * | 10/1990 | Jindrick et al. | 361/679.32 |
| 6,891,720 B2 | * | 5/2005 | Voon et al. | 361/679.31 |
| 2003/0011977 A1 | * | 1/2003 | Song et al. | 361/684 |
| 2004/0181388 A1 | * | 9/2004 | Yip et al. | 703/25 |
| 2007/0091504 A1 | * | 4/2007 | Ulrich | 360/97.01 |
| 2008/0130219 A1 | * | 6/2008 | Rabinovitz | 361/685 |

* cited by examiner

*Primary Examiner* — Anthony Haughton
(74) *Attorney, Agent, or Firm* — Kilpatrick Townsend & Stockton LLP

(57) ABSTRACT

A dock couples a removable data storage cartridge, for example an RDX cartridge, to a computing device. The dock includes a chassis having frontal dimensions configured to substantially match the nominal frontal dimensions of a low profile large format disk drive, such that the dock may reside in a bay in the computing device sized to receive a low profile large format disk drive. The dock may include a door that swings about an axis aligned with the height of the door.

23 Claims, 5 Drawing Sheets

REMOVABLE STORAGE SYSTEM FOR SERVER BAY

This application claims the benefit of U.S. Provisional Patent Application No. 61/310,092 filed Mar. 3, 2010 and titled "Cartridge Ejection System for Server Bay", the entire disclosure of which is hereby incorporated by reference herein.

BACKGROUND OF THE INVENTION

Recent computing trends have resulted in a desire to concentrate computing capability into smaller and smaller spaces. For example, in the client-server computing model, a central server may maintain data and perform certain computing tasks at the request of one or more clients, which may be remotely located and communicate with the server over a network. In a large organization or service provider, a central data center may contain hundreds or thousands of server computers, serving thousands of clients or more.

In order to reduce the cost of operating such data centers, it is desirable to make the server computers as power-efficient and space-efficient as possible. For example, "rack mount" servers may be configured to have a small vertical dimension and include mounting features so that several server computers may be mounted in a standard 19-inch rack. Server computers are now available with a height of one "rack unit", so that server computers can be spaced as little as 1.75 inches apart in a rack. "Blade servers" may be packed even more tightly, and may share a cabinet, power supplies, cooling, and other sharable computer components, rather than each server computer being a stand-alone machine with its own power supply, cabinet, peripherals, and the like.

This trend of increasing computing density has necessitated commensurate reductions in the sizes of various data storage devices.

BRIEF SUMMARY OF THE INVENTION

According to one aspect, a dock for coupling a removable data storage cartridge to a computing device includes a chassis having a width and a height that substantially match the nominal frontal dimensions of a low profile large form factor disk drive, wherein the nominal frontal dimensions of a low profile large form factor disk drive are 4 inches in width by 1.028 inches or less in height. The dock further includes a front bezel coupled to the chassis, the front bezel being exposed when the dock resides in a bay of the computing device, the front bezel defining an opening sized and shaped to receive the removable data storage cartridge. The dock also includes a circuit board mounted to the chassis, the circuit board including an electrical interface to the computing device, and the circuit board also including a connector to engage a mating connector of the removable data storage cartridge when the removable data storage cartridge is fully inserted into the dock. The dock further includes a door having a height and a width greater than the height, the door sized and shaped to substantially cover the opening when no removable cartridge is inserted into the dock, and the door being rotatable about an axis to admit the removable data cartridge when the removable data cartridge is inserted into the opening. In some embodiments, the rotation of the door is about an axis near one edge of the door, the edge aligned with the height of the door. The dock may be configured to couple an RDX data cartridge to the computing device. In some embodiments, the chassis has a length that substantially matches the nominal length of a low profile large form factor disk drive, wherein the nominal length of a low profile large form factor disk drive is 5.787 inches or less. In some embodiments, the dock further includes a spring that resists opening of the door and holds the door in position to substantially cover the opening when no removable cartridge is inserted into the dock, wherein the spring further, during insertion of the removable data cartridge, biases the removable data cartridge against a guiding feature by pressing the door against the removable data cartridge. The dock may include mounting elements coupled to the outside of the chassis to engage with mating mounting elements comprised in the computing device. The mounting elements may include rails sized and shaped to engage mating guides comprised in the computing device. In some embodiments, the dock further includes grommets that suspend the chassis from the mounting features when the dock is coupled to the computing device, the grommets providing at least partial isolation of the removable data cartridge from vibration of the computing device. In some embodiments, the dock includes a latching mechanism that includes a hook for engaging with an opening in a front wall of the removable data cartridge when the removable data cartridge is inserted into the dock. The dock may include an ejection mechanism that can automatically eject the removable data cartridge from the dock. In some embodiments, the ejection mechanism includes a motor, a gear train driven by the motor, and a set of stacked cams driven by the gear train, wherein, during rotation of the set of stacked cams, a first of the stacked cams moves the latching mechanism and a second of the stacked cams subsequently at least partially ejects the cartridge from the drive bay.

According to another aspect, a system for providing removable data storage includes a computing device having a bay sized for receiving a low profile large form factor mass storage device, wherein the nominal dimensions of a low profile large form factor mass storage device are 4 inches in width by 5.787 inches or less in length by 1.028 inches or less in height, and a dock residing in the bay. The dock includes a chassis having a width and a height that substantially match the nominal frontal dimensions of a low profile large form factor disk drive, wherein the nominal frontal dimensions of a low profile large form factor disk drive are 4 inches in width by 1.028 inches or less in height; a front bezel coupled to the chassis, the front bezel being exposed when the dock resides in a bay of the computing device, the front bezel defining an opening sized and shaped to receive the removable data storage cartridge; a circuit board mounted to the chassis, the circuit board including an electrical interface to the computing device, and the circuit board also including a connector to engage a mating connector of the removable data storage cartridge when the removable data storage cartridge is fully inserted into the dock; and a door having a height and a width greater than the height, the door sized and shaped to substantially cover the opening when no removable cartridge is inserted into the dock, and the door being rotatable about an axis to admit the removable data cartridge when the removable data cartridge is inserted into the opening. The system may be configured to receive an RDX data cartridge. The computing device may be a rack mounted server computer. The computing device may be a storage component.

According to another aspect, a method of providing removable data storage includes providing a computing device having a bay sized for receiving a low profile large form factor mass storage device, wherein the nominal dimensions of a large form factor mass storage device are 4 inches in width by 5.787 inches or less in length by 1.028 inches or less in height, and providing a dock. The dock includes a chassis having a width and a height that substantially match the nominal frontal dimensions of a low profile large form factor disk drive, wherein the nominal frontal dimensions of a low profile large form factor disk drive are 4 inches in width by 1.028 inches or less in height; a front bezel coupled to the chassis, the front bezel being exposed when the dock resides in a bay of the computing device, the front bezel defining an opening sized and shaped to receive the removable data storage cartridge; a circuit board mounted to the chassis, the circuit board including an electrical interface to the computing device and the circuit board also including a connector to engage a mating connector of the removable data storage cartridge when the removable data storage cartridge is fully inserted into the dock; and a door having a height and a width greater than the height, the door sized and shaped to substantially cover the opening when no removable cartridge is inserted into the dock, and the door being rotatable about an axis to admit the removable data cartridge when the removable data cartridge is inserted into the opening. The method further includes inserting the dock into the bay and electrically connecting the circuit board with circuitry in the computing device. In some embodiments, the system is configured to receive an RDX data cartridge. In some embodiments, connecting the circuit board with circuitry in the computing device includes connecting the circuit board with circuitry in the computing device via a cable.

According to another aspect, a system for coupling a removable data storage cartridge to a computing device includes a chassis having a width and a height that substantially match or are smaller than the nominal frontal dimensions of a low profile large form factor disk drive, wherein the nominal frontal dimensions of a low profile large form factor disk drive are 4 inches in width by 1.028 inches or less in height, and a front bezel coupled to the chassis. The front bezel is exposed when the dock resides in a bay of the computing device, and the front bezel defines an opening sized and shaped to receive within the chassis a removable data storage cartridge having a height of 0.90 inches or greater. In some embodiments, the opening is sized and shaped to receive an RDX storage cartridge. In some embodiments, the system further includes a door having a height and a width greater than the height, the door sized and shaped to substantially cover the opening when no removable cartridge is inserted into the dock, and the door being rotatable about an axis to admit the removable data cartridge when the removable data cartridge is inserted into the opening The rotation of the door may be about an axis near one edge of the door, the edge aligned with the height of the door. In some embodiments, the system is combined with the computing device, and the chassis resides within a bay in the computing device.

DETAILED DESCRIPTION OF THE INVENTION

Figure 1:
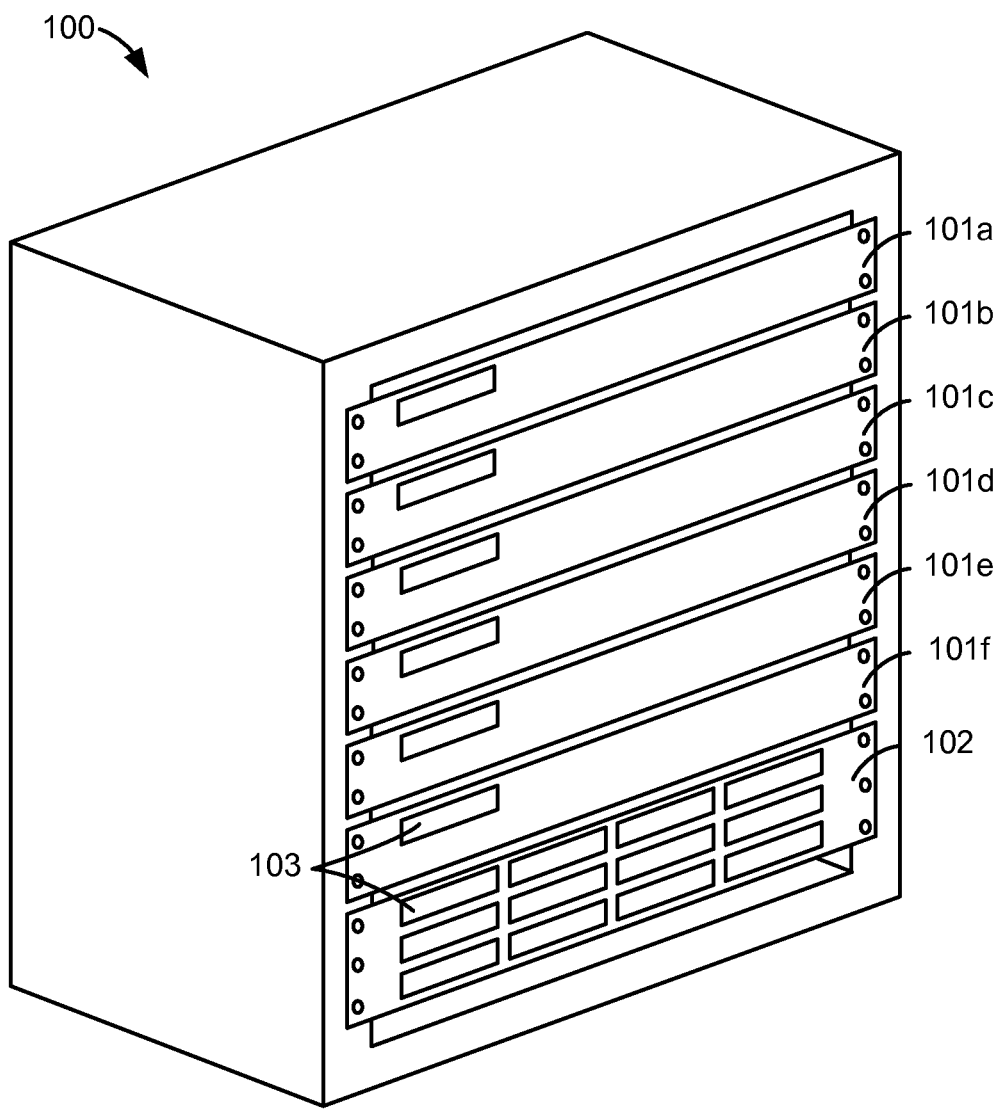
FIG. 1 illustrates a simplified oblique view of a rack computer system.

The trend of increasing computing density has included reductions in the sizes of some data storage devices. One standard size for magnetic disk drives is the "large form factor", which is a set of device dimensions that accommodates disk platters having a diameter of approximately 3.5 inches, the drive's read/write heads, a head actuator, any necessary circuitry, and an enclosure. A disk drive in the "large form factor" has a nominal width of 4 inches and a nominal length of about 5.25 inches. Several heights are possible, including "half height", meaning a nominal height of 1.63 inches (half of a historical form factor height of 3.25 inches), and "third height" or "low profile", meaning a nominal height of about 1 inch. More particularly, according to industry standards, a low profile large format disk drive is to have a nominal width of 4.000 inches, a maximum length of 5.787 inches, and a maximum height of 1.028 inches. For the purposes of this disclosure, the nominal dimensions of a face defined by the width and height of a form factor will be referred to as "nominal frontal dimensions" of the form factor. For example, the nominal frontal dimensions of a low profile large form factor drive are 4 inches in width by 1.028 inches or less in height.

A server computer may include bays for various storage media, including magnetic disk drives. Often, these drives may be "hot pluggable", meaning that they can be removed and replaced easily without powering down the server. This capability is primarily for easy replacement of a disk drive in the event of a drive failure, which is expected to be a rare event. Such drives are typically not intended to serve as removable storage, as discussed in more detail below. The server bays are sized to accommodate drives of standard sizes. For example, a bay intended to hold a low profile large format drive would be somewhat larger than 4 inches wide, and somewhat higher than 1 inch, to accommodate parts or features for mounting the drives in the bays. The exact dimensions of the bays may differ between server models, as different servers may use different mounting hardware to mount drives in bays.

Alternatively, a separate data storage component may be provided that includes bays for several storage devices, but does not include a server computer. The separate component may then be connected to one or more server computers in the same rack, or to other stand-alone, rack mounted, or blade computers. To conserve space, it is also desirable to provide as many bays in such a separate component as possible, for example by using low-profile storage devices and bays of commensurate size.

One important advantage of client-server computing is data security and integrity. A central data center can often implement more rigorous and structured data backup procedures than are the norm in a distributed computing environment, where responsibility for data security may be spread among individual computer users. One desirable form of backup is the use of removable data cartridges. Each cartridge may contain a disk, tape, solid state storage, or another kind of data storage medium to which data may be written. The cartridges can then be stored remotely from the computer itself, for additional security. Multiple backups may be stored on a rolling time basis or in separate locations, or other schemes may be used to further ensure data safety and accessibility.

There is accordingly a need to provide a way to include removable cartridge storage in computer systems having limited space for accommodating data storage devices. It is especially desirable to provide a way to include such storage in systems where the available height for accommodating storage devices is limited, and is only slightly larger than the height of a cartridge, for example providing RDX removable storage in a computing device configured to accommodate third-height or low profile large form factor disk drives.

FIG. 1 illustrates a simplified oblique view of a rack computer system 100 including several server computers 101a-f, and a separate storage component 102. By way of example, server computer 101f includes a bay 103 configured to receive a low-profile large format disk drive. Storage component 102 also includes a bay 103.

Figure 2A:
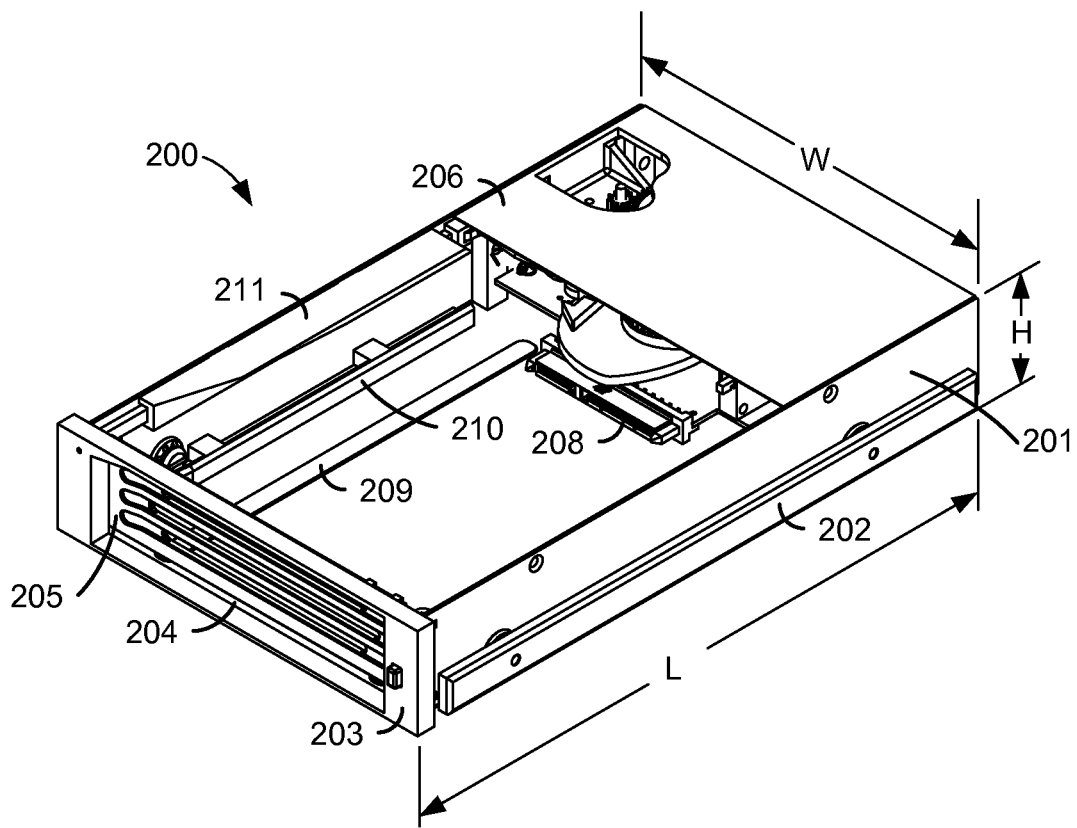
FIGS. 2A and 2B illustrate a dock for coupling a removable data cartridge to a computing device, in accordance with example embodiments of the invention.
Figure 2B:
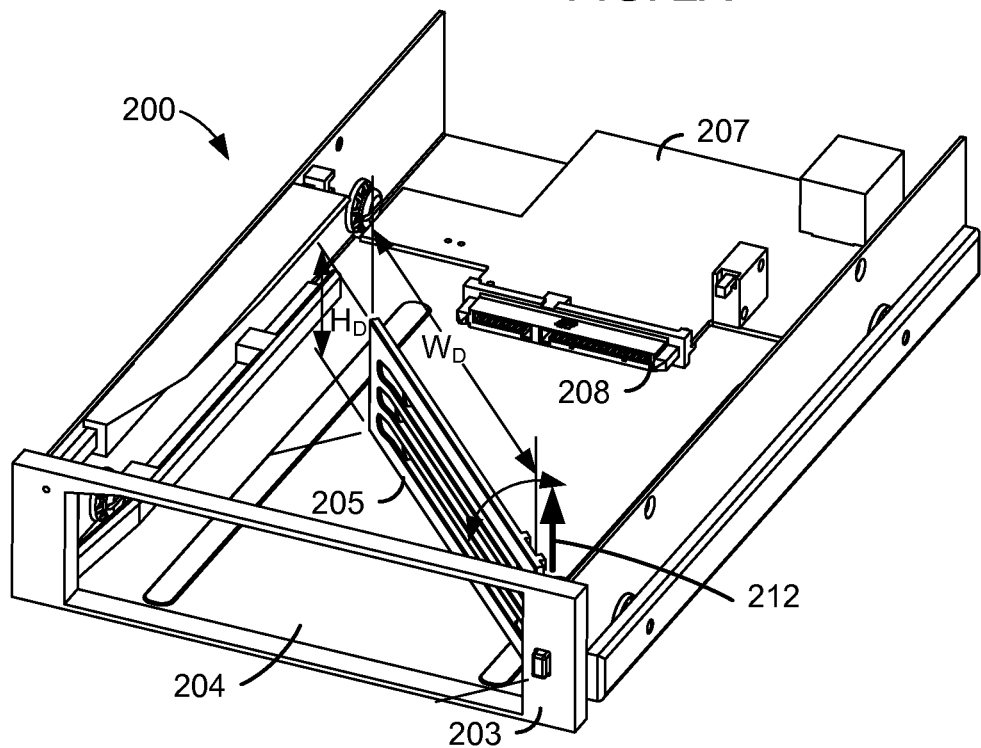

FIGS. 2A and 2B illustrate a dock 200 for coupling a removable data cartridge to a computing device, in accordance with example embodiments of the invention. For the purposes of this disclosure, a "computing device" is any device having a bay to accommodate dock 200 and performing some function in a computing system. For example, a rack-mount server or standalone computer may be a computing device. Similarly, a storage component intended to connect to a computer may be a computing device.

Dock 200 includes a chassis 201 that is configured to substantially match the nominal frontal dimensions of a low-profile large form factor disk drive. That is, the width W of the chassis is nominally 4 inches, and the height H of the chassis is nominally 1.028 inches or less. The length L of the chassis may also match the nominal length of the large form factor at 5.787 inches or less, but some variation may be tolerated. Mounting elements are attached to the outside of chassis 201 for mounting the chassis in a bay of a computing device such as computer system 100. In this example, the mounting elements include a rail 202, and a corresponding rail on the opposing side of chassis 201, hidden from view in FIGS. 2A and 2B. Rails 202 may enable dock 200 to easily slide into a bays such as bay 103. Other kinds of mounting features may be used, compatible with particular computer system models with which dock 200 may be used.

Dock 200 further includes a front bezel 203, which defines an opening 204 configured to receive a removable data cartridge. In FIG. 2A, opening 204 is substantially covered by a door 205. In FIG. 2B, door 205 is shown in a partially open position, so that it no longer blocks opening 204. Enclosing base 206, shown in FIG. 2A, has also been removed in FIG. 2B, for clarity of illustration of some other features of dock 200. For example, dock 200 also includes a circuit board 207, which holds various electronic circuitry used for operating dock 200, for communicating with a data cartridge inserted in dock 200, and for communicating with a computing device in which dock 200 is installed. An electrical connector 208 is positioned to connect to a storage cartridge inserted into dock 200. Dock 200 also includes guiding features for positioning a removable data storage cartridge inserted into dock 200. For example, bottom guide 209 and a companion guide (not visible in FIG. 2A) provide a lower datum surface for an inserted cartridge. Lower guide 210 provides a side datum surface. Upper guide 211 may constrain an inserted cartridge vertically and prevent possible misinsertion of a cartridge.

One of skill in the art will recognize that directional terms such as top, bottom, height, width, and the like refer directions in relation to the orientation of dock 200 shown in FIGS. 2A and 2B, and that dock 200 may be used in other orientations. For example, dock 200 could be positioned on edge, so that the "height" H is actually oriented horizontally.

Figure 3A:
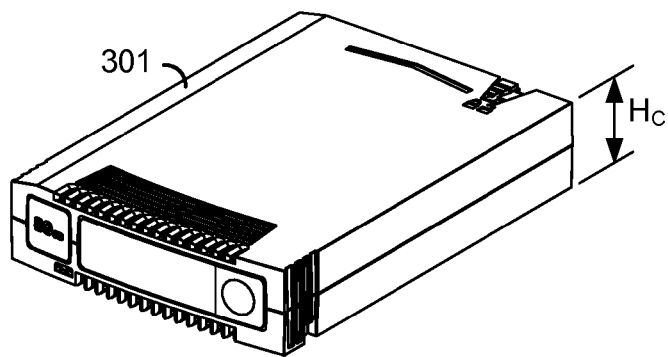
FIGS. 3A and 3B show respectively rear and front oblique views of an RDX cartridge.
Figure 3B:
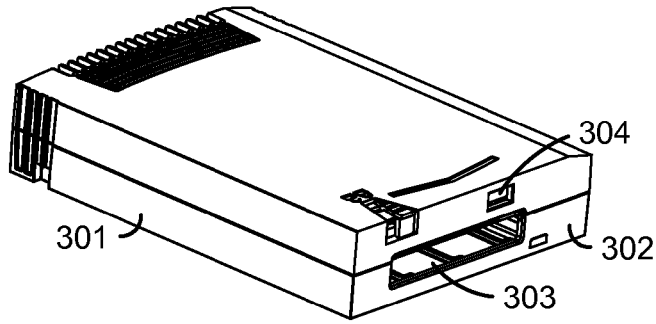

One convenient, reliable, and cost-effective form of removable storage is the RDX technology, developed by Prostor Systems Inc., of Boulder, Colo., USA. RDX utilizes removable cartridges, each containing a magnetic disk. FIGS. 3A and 3B show respectively rear and front oblique views of an RDX cartridge 301. RDX cartridge 301 preferably complies with the specifications detailed in the document "RDX Removable Disk Technology Technical Specifications" available from Prostor Systems Inc. or from the RDX Storage Alliance, the entire disclosure of which document is hereby incorporated by reference herein in its entirety. In accordance with the RDX specifications, cartridge 301 has a height $H_C$ of approximately 23.4-23.7 millimeters (0.92-0.93 inches). RDX cartridge 301 includes a front wall 302 having two openings 303 and 304. Opening 303 provides access to a mating electrical connector (not visible in FIG. 3B) positioned to couple with connector 208 in dock 200 when cartridge 301 is fully inserted into dock 200. Opening 304 provides a purchase for a latching mechanism described in more detail below for holding cartridge 301 securely in dock 200.

As is best seen in FIG. 2A, door 205 has a height $H_D$ and a width $W_D$ which is greater than height $H_D$. Door 204 is configured to rotate about an axis of rotation 212 to admit a cartridge such as RDX cartridge into dock 200. Axis of rotation 212 is near one of the short edges of door 204 aligned with the height of door 205, so that door 205 swings to a side of opening 204.

Figure 4:
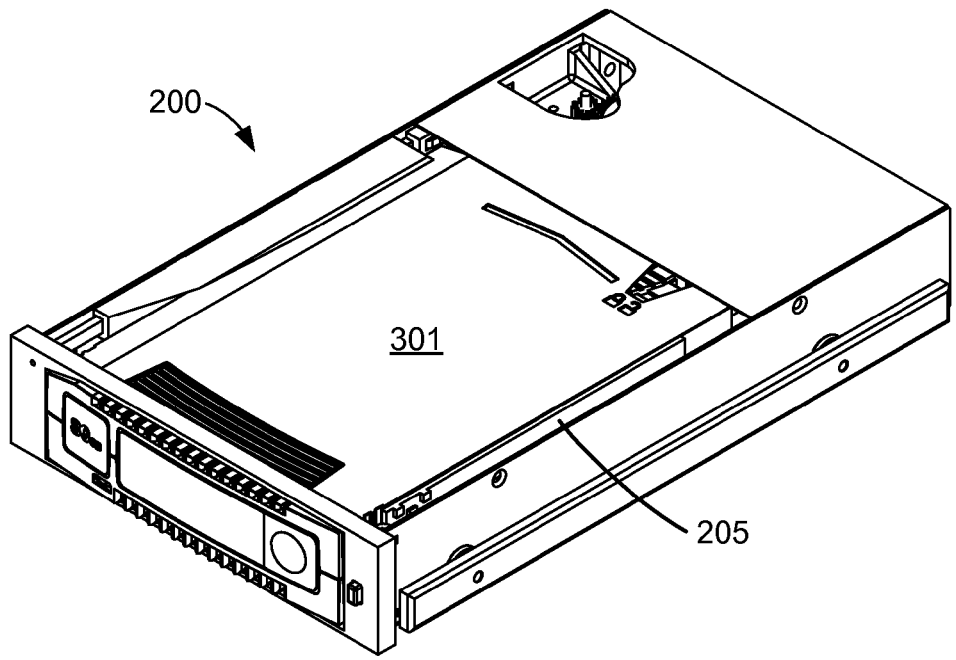
FIG. 4 illustrates the dock of FIGS. 2A and 2B with an RDX cartridge fully inserted, in accordance with embodiments of the invention.

FIG. 4 illustrates dock 200 with RDX cartridge 301 fully inserted. As can be seen in FIG. 4, once cartridge 301 is inserted into dock 200, door 205 resides along one side of cartridge 301. Door 205 thus does not add to the overall height of dock 200, even when cartridge 301 is present. Door 205 is preferably spring loaded, so that door 205 is firmly positioned against front bezel 203 when no cartridge is present and door 205 is closed, but is readily opened by a cartridge being inserted into dock 200. The spring loading has the additional advantage that when a cartridge such as cartridge 301 is inserted into dock 200, door 205 biases the cartridge against lower guide 210, and facilitates proper registration of the cartridge and proper engagement of connector 208 with the mating connector in the cartridge.

Figure 5:
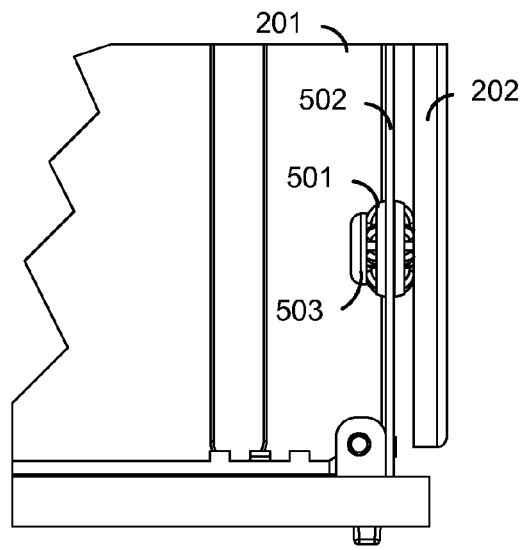
FIG. 5 illustrates additional details of mounting elements of the dock of FIGS. 2A and 2B, according to embodiments of the invention.

FIG. 5 illustrates additional details about mounting elements 202 and their attachment to chassis 201, according to embodiments of the invention. FIG. 5 is a top orthogonal view of one point of attachment of mounting rail 202 to chassis 201. In this example arrangement, a grommet 501 is inserted into a hole in a sidewall 502 of chassis 201. Grommet 501 may be, for example, made of an elastomeric material that may also have vibration absorbing properties. Grommet 501 is preferably generally toroidal, including a groove for capturing grommet in side wall 502 and a through hole to accommodate screw 503. Screw 503 may be, for example a shoulder screw. Similar grommets are preferably provided at other points of attachment between mounting features 202 and chassis 201, such that when dock 200 is installed in a computer system or other computing device, the grommets suspend chassis 201 and provide a degree of isolation of dock 200, and consequently any removable data cartridge in dock 200, from vibration of the computing device.

Figure 6:
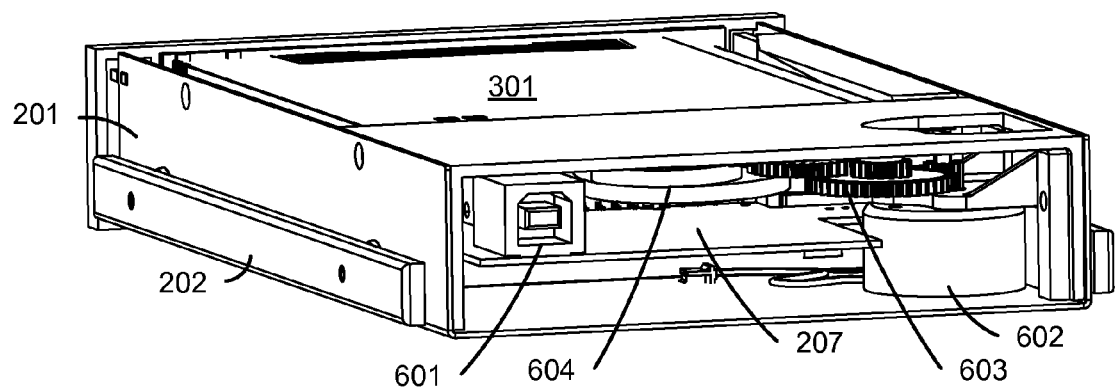
FIG. 6 shows a rear oblique view of the dock of FIGS. 2A and 2B, in accordance with embodiments of the invention.

FIG. 6 shows a rear oblique view of dock 200, in accordance with embodiments of the invention, with a removable data cartridge 301 installed. A connector 601 resides on circuit board 207, and is configured to provide an electrical interface to the computer system or other computing device in which dock 200 may be mounted. The electrical interface may be, for example, a Universal Serial Bus (USB) "B" connector, and the electrical interface to the dock may be a USB 2.0 or USB 3.0 interface. Other kinds of interfaces may be used, for example a Serial Advanced Technology Attachment (SATA) interface, or any other suitable interface. Preferably, the electrical connection between the computing device and connector 601 is made via a cable, rather than a card edge connector, so that vibration from the computing device is not readily transmitted to dock 200. In some embodiments, power for operating circuitry on circuit board 207 is derived from the electrical interface, via connector 601, so that no separate power connection is needed. Alternatively, a separate power supply could be provided. Even though dock 200 may be installed in a bay similar to a bay designed to accommodate a hot pluggable disk drive, dock 200 may not be considered to be readily removable from the computer system or other device in which it is installed. It is contemplated that the connection to connector 601 be made when the computer or other device is built or configured, and that dock 200 remains in place, while removable data cartridges can be readily inserted and removed from dock 200. Of course, it may still be possible to remove and replace dock 200, for example in a service operation.

Figure 7:
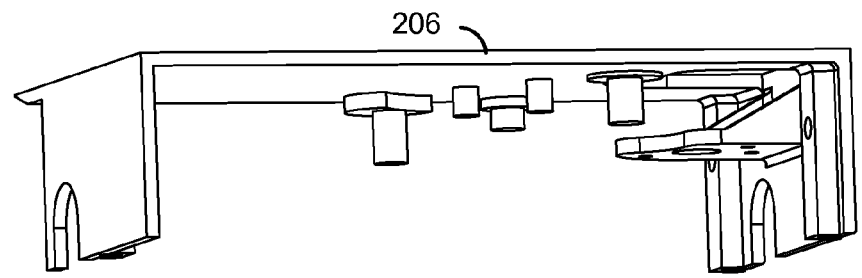
FIG. 7 illustrates a lower oblique view of a portion of the dock of FIGS. 2A and 2B, in accordance with embodiments of the invention.

FIG. 6 also shows certain elements of an ejection mechanism for ejecting a cartridge from dock 200, in accordance with embodiments of the invention. The example ejection mechanism of FIG. 6 includes a motor 602 and a gear train 603 through which motor 602 drives a set of stacked cams 604. Preferably, motor 602, gear train 603, and cam set 604 are mounted to enclosing base 206. FIG. 7 illustrates a lower oblique view of enclosing base 206 in isolation, in accordance with embodiments of the invention, showing various mounting surfaces and shafts for holding motor 602, gear train 603, and cam set 604.

Figure 8:
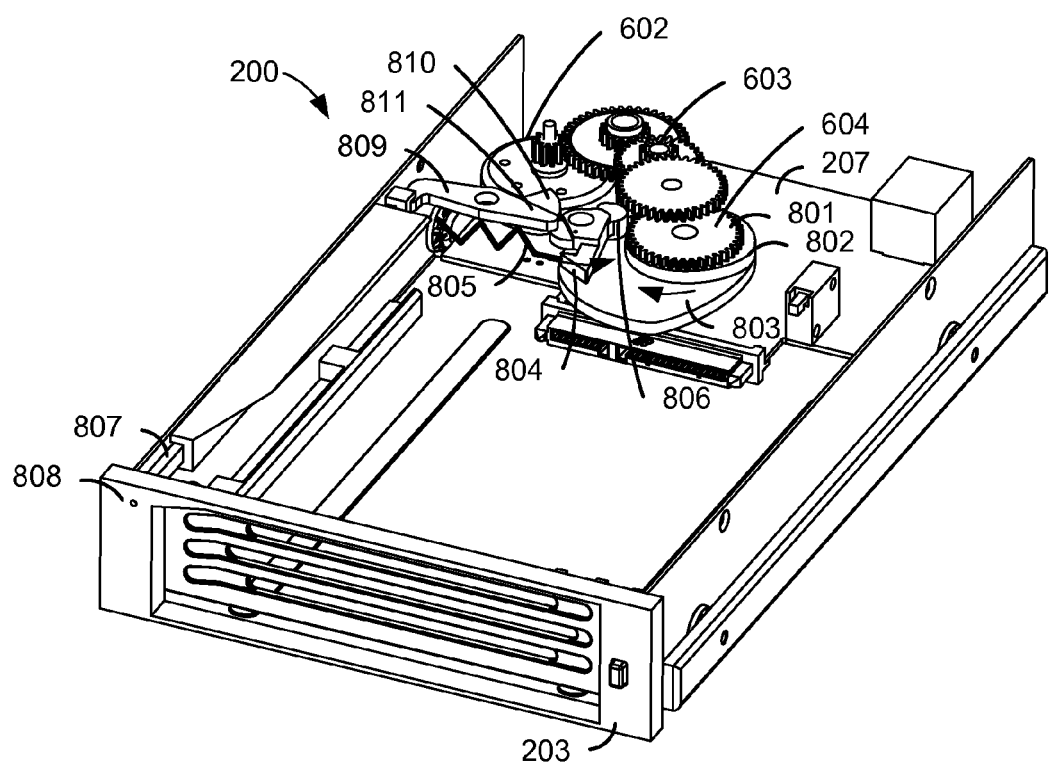
FIG. 8 illustrates an ejection mechanism, in accordance with embodiments of the invention.

FIG. 8 is an upper oblique view that illustrates the ejection mechanism in more detail. Enclosing base 206 has been removed from FIG. 8 to reveal the workings of the ejection mechanism. Stacked cam set 604 includes a gear 801, an upper cam 802, and a lower cam 803, all fixed together or formed as a monolithic part. For example, stacked cam set 604 may preferably be molded from nylon or acetal. Acetal is available under the trade name Delrin® from E. I. du Pont de Nemours and Company of Wilmington, Del., USA. The gears in gear train 603 may be similarly constructed. Other suitable materials and fabrication techniques may also be used to make any of the gears in gear train 603 or stacked cam set 604.

A latching mechanism 804 includes a hook configured to engage a cartridge inserted into dock 200, for example at front wall 302 of cartridge 301 via opening 304. (If no cartridge is present, cam 803 is normally positioned so that does not interfere with the insertion of a cartridge.) Latching mechanism 804 is preferably held in position by a spring 805, and holds a cartridge securely in dock 200 until the cartridge is intentionally ejected, either automatically or manually by an operator.

When automatic ejection is performed, motor 602 turns stacked cams 604 via gear train 603 and gear 801. Upper cam 802 first bears against follower 806, causing latching mechanism 804 to rotate to disengage the hook from the cartridge. Subsequently, cam 803 engages the front surface of the cartridge and pushes the cartridge away from circuit board 207, disengaging connector 208 and making the cartridge accessible to be pulled from the front of dock 200.

In some circumstances, for example in the event of a power failure, it may be necessary to eject a cartridge from dock 200 without the use of motor 602. For this purpose, a plunger 807 may be provided, accessible by pushing a thin object through hole 808 in front bezel 203. Plunger 807 actuates bell crank 809, causing it to rotate about an axle. Lobe 810 of bell crank 809 first actuates latching mechanism 804 to disengage the hook from the cartridge, and then lever end 811 of bell crank engages the front wall of the cartridge and pushes the cartridge away from circuit board 207, disengaging connector 208 and making the cartridge accessible to be pulled from the front of dock 200.

Embodiments of the invention thus provide a way to couple a removable data storage cartridge to a computing device via a bay in the computing device sized for receiving a low profile large format disk drive. Embodiments of the invention may be especially useful in conjunction with RDX storage technology, in which the storage cartridges are nearly as high as a low profile disk drive.

Specific details are given in the above description to provide a thorough understanding of the embodiments. However, it is understood that the embodiments may be practiced without these specific details. The invention has now been described in detail for the purposes of clarity and understanding. However, those skilled in the art will appreciate that certain changes and modifications may be practiced within the scope of the appended claims.

What is claimed is:

1. A dock for coupling a removable data storage cartridge to a computing device, the dock comprising:
   a chassis having a width and a height that substantially match the nominal frontal dimensions of a low profile large form factor disk drive, wherein the nominal frontal dimensions of a low profile large form factor disk drive are 4 inches in width by 1.028 inches or less in height;
   a front bezel coupled to the chassis, the front bezel being exposed when the dock resides in a bay of the computing device, the front bezel defining an opening sized and shaped to receive the removable data storage cartridge;
   a circuit board mounted to the chassis, the circuit board including an electrical interface to the computing device, and the circuit board also including a connector to engage a mating connector of the removable data storage cartridge when the removable data storage cartridge is fully inserted into the dock; and
   a door having a height and a width greater than the height, the door sized and shaped to substantially cover the opening when no removable cartridge is inserted into the dock, and the door being rotatable about an axis to admit the removable data cartridge when the removable data cartridge is inserted into the opening.

2. The dock for coupling a removable data storage cartridge to a computing device of claim 1, wherein the rotation of the door is about an axis near one edge of the door, the edge aligned with the height of the door.

3. The dock for coupling a removable data storage cartridge to a computing device of claim 1, wherein the dock is configured to couple an RDX data cartridge to the computing device.

4. The dock for coupling a removable data storage cartridge to a computing device of claim 1, wherein the chassis has a length that substantially matches the nominal length of a low profile large form factor disk drive, wherein the nominal length of a low profile large form factor disk drive is 5.787 inches or less.

5. The dock for coupling a removable data storage cartridge to a computing device of claim 1, further comprising:
   a spring that resists opening of the door and holds the door in position to substantially cover the opening when no removable cartridge is inserted into the dock, wherein the spring further, during insertion of the removable data cartridge, biases the removable data cartridge against a guiding feature by pressing the door against the removable data cartridge.

6. The dock for coupling a removable data storage cartridge to a computing device of claim 1, further comprising:
mounting elements coupled to the outside of the chassis to engage with mating mounting elements comprised in the computing device.

7. The dock for coupling a removable data storage cartridge to a computing device of claim 6, wherein the mounting elements comprise rails sized and shaped to engage mating guides comprised in the computing device.

8. The dock for coupling a removable data storage cartridge to a computing device of claim 6, further comprising:
grommets that suspend the chassis from the mounting features when the dock is coupled to the computing device, the grommets providing at least partial isolation of the removable data cartridge from vibration of the computing device.

9. The dock for coupling a removable data storage cartridge to a computing device of claim 1, further comprising:
a latching mechanism that includes a hook for engaging with an opening in a front wall of the removable data cartridge when the removable data cartridge is inserted into the dock.

10. The dock for coupling a removable data storage cartridge to a computing device of claim 9, further comprising:
an ejection mechanism that can automatically eject the removable data cartridge from the dock.

11. The dock for coupling a removable data storage cartridge to a computing device of claim 10, wherein the ejection mechanism further comprises:
a motor;
a gear train driven by the motor;
a set of stacked cams driven by the gear train, wherein, during rotation of the set of stacked cams, a first of the stacked cams moves the latching mechanism and a second of the stacked cams subsequently at least partially ejects the cartridge from the drive bay.

12. A system for providing removable data storage, the system comprising:
a computing device having a bay sized for receiving a low profile large form factor mass storage device, wherein the nominal dimensions of a low profile large form factor mass storage device are 4 inches in width by 5.787 inches or less in length by 1.028 inches or less in height; and
a dock residing in the bay, wherein the dock comprises
a chassis having a width and a height that substantially match the nominal frontal dimensions of a low profile large form factor disk drive, wherein the nominal frontal dimensions of a low profile large form factor disk drive are 4 inches in width by 1.028 inches or less in height;
a front bezel coupled to the chassis, the front bezel being exposed when the dock resides in a bay of the computing device, the front bezel defining an opening sized and shaped to receive the removable data storage cartridge;
a circuit board mounted to the chassis, the circuit board including an electrical interface to the computing device, and the circuit board also including a connector to engage a mating connector of the removable data storage cartridge when the removable data storage cartridge is fully inserted into the dock; and
a door having a height and a width greater than the height, the door sized and shaped to substantially cover the opening when no removable cartridge is inserted into the dock, and the door being rotatable about an axis to admit the removable data cartridge when the removable data cartridge is inserted into the opening.

13. The system of claim 12, wherein the system is configured to receive an RDX data cartridge.

14. The system of claim 12, wherein the computing device is a rack mounted server computer.

15. The system of claim 12, wherein the computing device is a storage component.

16. A method of providing removable data storage, the method comprising:
providing a computing device having a bay sized for receiving a low profile large form factor mass storage device, wherein the nominal dimensions of a large form factor mass storage device are 4 inches in width by 5.787 inches or less in length by 1.028 inches or less in height;
providing a dock, the dock comprising
a chassis having a width and a height that substantially match the nominal frontal dimensions of a low profile large form factor disk drive, wherein the nominal frontal dimensions of a low profile large form factor disk drive are 4 inches in width by 1.028 inches or less in height;
a front bezel coupled to the chassis, the front bezel being exposed when the dock resides in a bay of the computing device, the front bezel defining an opening sized and shaped to receive the removable data storage cartridge;
a circuit board mounted to the chassis, the circuit board including an electrical interface to the computing device and the circuit board also including a connector to engage a mating connector of the removable data storage cartridge when the removable data storage cartridge is fully inserted into the dock; and
a door having a height and a width greater than the height, the door sized and shaped to substantially cover the opening when no removable cartridge is inserted into the dock, and the door being rotatable about an axis to admit the removable data cartridge when the removable data cartridge is inserted into the opening; and
inserting the dock into the bay and electrically connecting the circuit board with circuitry in the computing device.

17. The method of claim 16, wherein the system is configured to receive an RDX data cartridge.

18. The method of claim 16, wherein connecting the circuit board with circuitry in the computing device comprises connecting the circuit board with circuitry in the computing device via a cable.

19. A dock for coupling a removable data storage cartridge to a computing device, the dock comprising:
a chassis having a width and a height such that the chassis is mountable in a bay of the computing device of a size and shape to receive a low profile large form factor disk drive, wherein the nominal frontal dimensions of a low profile large form factor disk drive are 4 inches in width by 1.028 inches or less in height;
a front bezel coupled to the chassis, the front bezel being exposed when the dock resides in a bay of the computing device, the front bezel defining an opening sized and shaped to receive within the chassis a removable data storage cartridge having a height of 0.90 inches or greater;
a circuit board mounted to the chassis, the circuit board including an electrical interface to the computing device, and the circuit board also including a connector to engage a mating connector of the removable data storage cartridge when the removable data storage cartridge is fully inserted into the dock; and mounting elements coupled to the outside of the chassis to engage with mating mounting elements comprised in the computing device to hold the dock in the bay while the removable storage cartridge is inserted and removed.

20. The system for coupling a removable data storage cartridge to a computing device as recited in claim 19, wherein the opening is sized and shaped to receive an RDX storage cartridge.

21. The system for coupling a removable data storage cartridge to a computing device as recited in claim 19, further comprising:

a door having a height and a width greater than the height, the door sized and shaped to substantially cover the opening when no removable cartridge is inserted into the dock, and the door being rotatable about an axis to admit the removable data cartridge when the removable data cartridge is inserted into the opening.

22. The system for coupling a removable data storage cartridge to a computing device as recited in claim 21, wherein the rotation of the door is about an axis near one edge of the door, the edge aligned with the height of the door.

23. The system for coupling a removable data storage cartridge to a computing device as recited in claim 19, in combination with the computing device, the chassis residing within a bay in the computing device.

* * * * *